US009077715B1

(12) United States Patent
Satish et al.

(10) Patent No.: US 9,077,715 B1
(45) Date of Patent: Jul. 7, 2015

(54) SOCIAL TRUST BASED SECURITY MODEL

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 2014 days.

(21) Appl. No.: 11/394,846

(22) Filed: Mar. 31, 2006

(51) Int. Cl.
*G06F 21/00* (2013.01)
*H04L 29/06* (2006.01)

(52) U.S. Cl.
CPC ............... *H04L 63/10* (2013.01); *G06F 21/00* (2013.01)

(58) Field of Classification Search
CPC ..... H04L 63/10; G06F 17/3053; G06F 21/00; G06F 21/60
USPC .......... 380/276–278, 284, 286; 713/182–185, 713/176; 726/28, 30, 33; 714/22–30
See application file for complete search history.

(56) References Cited

U.S. PATENT DOCUMENTS

| | | | |
|---|---|---|---|
| 7,269,851 B2 * | 9/2007 | Ackroyd | 726/24 |
| 7,831,412 B1 | 11/2010 | Sobel et al. | |
| 7,966,278 B1 | 6/2011 | Satish | |
| 8,219,983 B1 | 7/2012 | Sobel et al. | |
| 8,225,406 B1 | 7/2012 | Nachenberg | |
| 8,255,902 B1 | 8/2012 | Satish | |
| 8,762,987 B1 | 6/2014 | Satish | |
| 2004/0205167 A1 | 10/2004 | Grumann | |
| 2005/0021733 A1 | 1/2005 | Clinton et al. | |
| 2005/0233295 A1 | 10/2005 | Chiszar et al. | |
| 2005/0283622 A1 | 12/2005 | Hall et al. | |
| 2005/0283831 A1 * | 12/2005 | Ryu et al. | 726/11 |
| 2006/0042483 A1 * | 3/2006 | Work et al. | 101/91 |
| 2006/0253584 A1 * | 11/2006 | Dixon et al. | 709/225 |
| 2007/0016953 A1 | 1/2007 | Morris et al. | |
| 2007/0162458 A1 * | 7/2007 | Fasciano | 707/10 |
| 2007/0300215 A1 | 12/2007 | Bardsley | |
| 2008/0141240 A1 | 6/2008 | Uthe | |
| 2009/0133126 A1 | 5/2009 | Jang et al. | |
| 2009/0138856 A1 | 5/2009 | Oja et al. | |

OTHER PUBLICATIONS

Anonymous, "System and Method for Cloud-Source Based Resource Recommendation", Dec. 1, 2014, ip.com, p. 1-2.*
Keith Newstadt, et al; Systems and Methods for Monitoring the Activity of Devices Within an Organization by Leveraging Data Generated by an Existing Security Solution Deployed Within the Organization; U.S. Appl. No. 13/291,773, filed Nov. 8, 2011.
William E. Sobel, et al; Systems and Methods for Providing Guidance on the Potential Impact of Application and Operating-System Changes on a Computing System; U.S. Appl. No. 12/059,003, filed Mar. 31, 2008.

(Continued)

*Primary Examiner* — Taghi Arani
*Assistant Examiner* — Gregory Lane
(74) *Attorney, Agent, or Firm* — ALG Intellectual Property, LLC

(57) ABSTRACT

Making a trust decision is disclosed. One or more members of a social trust network are polled for information associated with a trust decision about a computing environment. The information includes information collected automatically with respect to activities of one or more of the one or more members of the social trust network. At least one action is taken based at least in part on the information.

20 Claims, 8 Drawing Sheets

(56) References Cited

OTHER PUBLICATIONS

Carey S. Nachenberg; Systems and Methods for Using Reputation Data to Detect Shared-Object-Based Security Threats; U.S. Appl. No. 12/415,834, filed Mar. 31, 2009.

Microsoft, Frequently asked questions about Windows Defender (Beta2), http://www.microsoft.com/athome/security/spyware/software/about/faq.mspx, Feb. 14, 2006.

* cited by examiner

SOCIAL TRUST BASED SECURITY MODEL

BACKGROUND OF THE INVENTION

Computer security products such as antivirus and antispyware applications and services typically work by scanning a user's computer for blacklisted malicious software/code (hereinafter "malware"). As attackers create new malicious programs, the vendors are forced to update the blacklists in the security products. Attackers continue the cycle by creating new pieces of malware—leaving users vulnerable until vendors release updated blacklists.

Additionally, as operating systems and applications are increasingly hardened against attacks (such as through the application of better design principles), attackers are turning to social engineering attacks such as phishing and evil twin attacks, as well as tactics such as bundling malware (including adware and spyware) with otherwise legitimate software in the hopes of tricking users into downloading and installing their damaging programs and evading detection. Even in the case of non-malicious software, incompatibilities, bugs, and exploitable vulnerabilities can all cause potentially devastating problems for a user—problems against which antivirus and antispyware applications do not protect.

Therefore, it would be desirable to have a better way to inform trust decisions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium, such as computer-readable instructions stored on a physical computer-readable-storage medium, or via a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
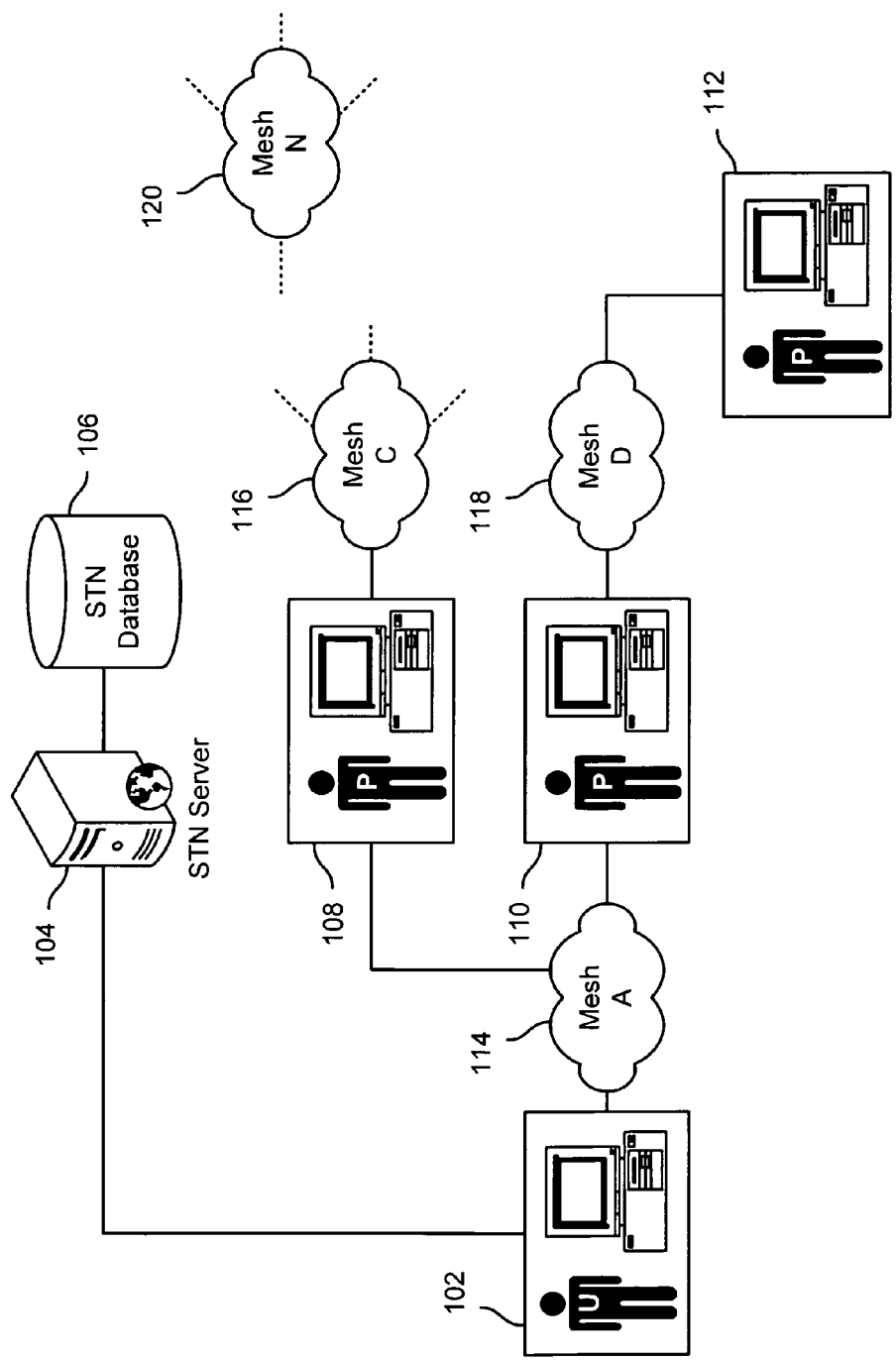
FIG. 1 is a diagram illustrating an embodiment of a social trust network environment.

FIG. 1 is a diagram illustrating an embodiment of a social trust network environment. Members of the network (102, 104, and 108-112) are connected through one or more meshes (114-120). In the example shown, members of the network communicate with each other (sending and/or receiving information) via a DNS-like inquiry channel. In some embodiments, other communication channels (and/or user interfaces), such as instant messaging services (e.g., Jabber) or the People Near Me platform in Windows Vista are used. In the example shown, user 102 is connected to peers 108 and 110 via mesh 114. As used herein, peer 108 and peer 110 are peers of user 102. The terms "peers" and "users" are used herein interchangeably. Member 112 is a peer of the other members of mesh 118 (including member 110), but not of user 102. As described in more detail below, in some embodiments, degrees of separation are taken into account. For example, member 108 is a direct peer of user 102. Other members of mesh 116 are not directly connected to user 102, but may nonetheless interact with user 102, e.g., as sub-peers, if desired.

As described in more detail below, the social trust network is leveraged by its members to provide a more reliable and secure computing experience. Peers keep track of information such as the performance reliability of their computers, the performance reliability of applications that they run, any malicious behavior they encounter, and the security posture (e.g., date of last virus scan and whether a firewall is configured) of their computers. As applicable, user 102 polls one or more peers to make decisions such as whether to install an application, visit a website, enter personal information, open an email, or make a purchase, based at least in part on the experiences of the peers.

In some embodiments, this information is collected and tracked automatically, with minimal, if any, action on the part of the member. In some embodiments, additional information, such as a member's personal opinion of particular software or a website is also maintained by the member. As described in more detail below, information is typically collected and shared in an asynchronous fashion. When a peer determines that a particular application has a memory leak, in some embodiments, that information is not conveyed to user 102 unless/until user 102 asks about the application. In some embodiments, information is immediately conveyed to peers. Such may be the case, for example, when the peer discovers a worm or other highly contagious and dangerous malware.

User 102 is also connected to social trust network server 104 (herein after "STN server"). Peers are also connected (not shown) to STN server 104. In the example shown, STN server is a scalable DNS-like clustered infrastructure. As described in more detail below, STN server 104 coordinates the formation of meshes, for example by managing the identities of participants, managing mesh identifiers, and associating a degree of trust to the degree of separation that might exist between members. STN server 104 also participates in the consumption and distribution of information. In addition to information provided to STN server 104 by an administrator, STN server 104 also receives information from peers and responds to peers' requests for information.

Figure 2:
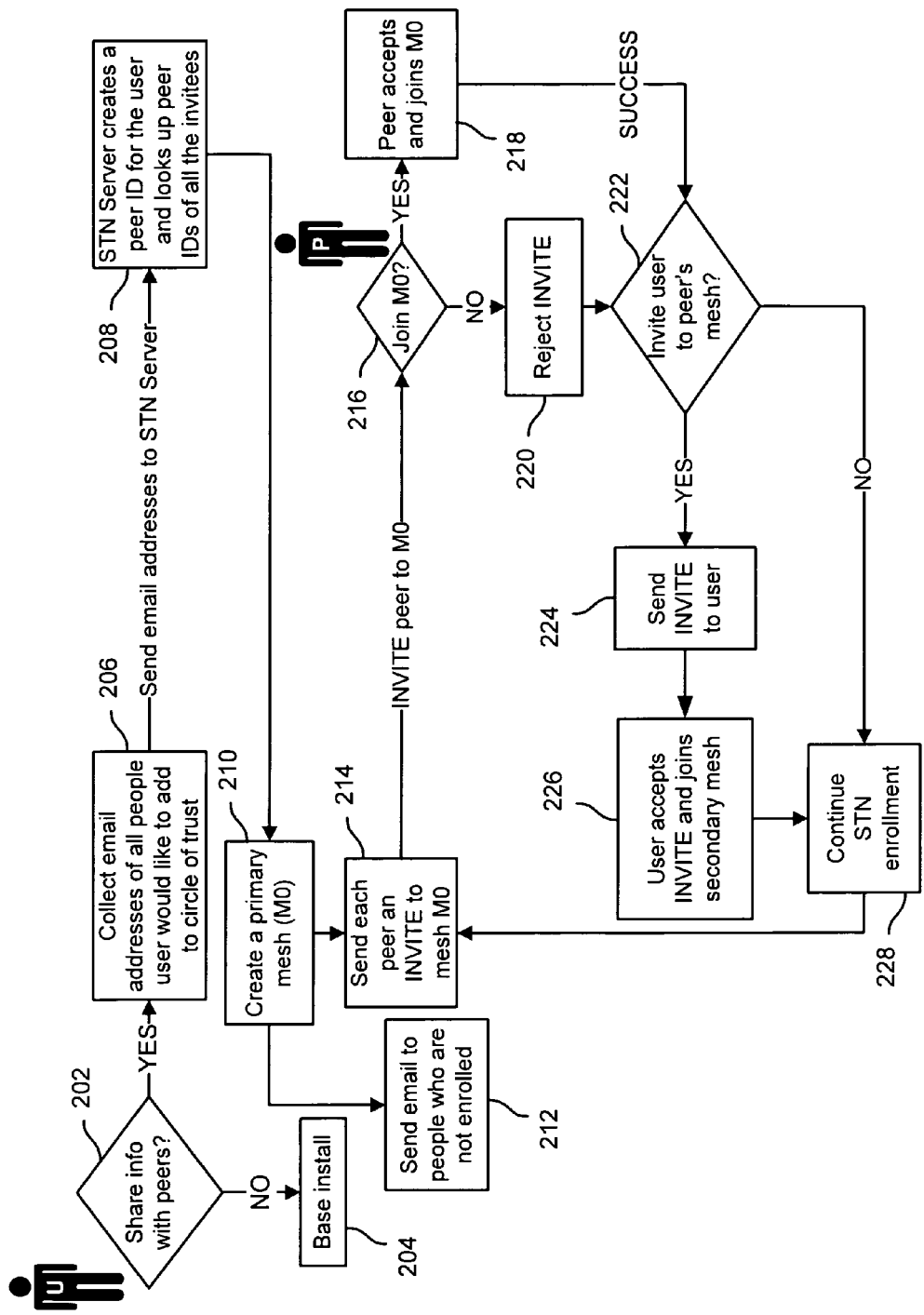
FIG. 2 is a flow chart illustrating an embodiment of a process for enrolling in a social trust network environment.

FIG. 2 is a flow chart illustrating an embodiment of a process for enrolling in a social trust network environment. The example shown illustrates an embodiment of the enrollment process used by the social trust network environment described in conjunction with FIG. 1. Other enrollment processes may be used, as applicable and may depend, for example, on which protocols are used by members of the social trust network to convey and receive information.

When a user first executes social trust network programming (e.g., an install file installing an STN agent on the user's computer), the user is asked whether or not the user would like to share information with peers (202). In some embodiments, the information shared with peers is encrypted, scrubbed of identifying information, conveyed via a secure channel, and/or otherwise safeguarded. Nevertheless, a user may not wish to provide information to peers, but instead only consume advice from others. In the example shown, the user may opt out of sharing information with others, but is also prevented from forming or joining meshes and instead receives information from the STN server only (204). In other embodiments, other approaches may be taken—such as allowing the user to "leech" off of one or more nodes by consuming information without providing it to peers, or omitting the option presented in 202 and instead requiring mandatory participation with peers.

If the user does wish to fully participate as a peer in the STN, at 206, the user is prompted to provide the contact information (e.g., email address and name) of one or more invitees. In the example shown, the invitee list is provided to the STN server which assigns an identifier to the user (a "peer ID") and determines whether any of the invitees are already enrolled in the STN (208). The STN server then returns to the user a set of peer IDs that form an initial, primary mesh—comprising the user and any invitees who were already enrolled (210). At 212, any invitees who were not already enrolled are sent an invitation to join the STN. In the example shown, the email is sent by the STN server which monitors for affirmative responses and updates the primary mesh accordingly to include any new members. In other cases, the user's computer may be configured to send the invitations, or invitations may be made through other channels—such as via instant message rather than or in addition to email. In some embodiments, STN enrollment is coupled with another service, such as an instant messaging client, and a visual indication (e.g., a special icon) is used to signify that a person is or is not currently enrolled in the STN. In such a case, enrollment may occur, e.g., by a user following a link in a context menu within the instant messaging client.

At 214, the user's invitees who have peer IDs (i.e., those who are now enrolled in the STN) are invited to join the user's primary mesh. A user's primary mesh is the mesh that the user controls. In some embodiments, the user may add and remove peers from the primary mesh and perform other administrative tasks. In the example shown in FIG. 1, mesh 114 is user 102's primary mesh. At 216, an invited peer determines whether to join the user's mesh. In the example shown in FIG. 2, irrespective of whether the peer decides to join the user's primary mesh (218) or not (220), the peer determines whether to invite the user to the peer's mesh at 222. If so, an invitation is sent at 224.

In the example shown, at 226, the user always joins an invitee's mesh if the invitee has already formed one. One reason for doing this is that invitees that have been using the STN environment for a while and built up a mesh of helpful peers (many of whom have probably also used the software for a while) will likely be more beneficial to a new user than a small mesh made up mostly of new members. In such a case, it may be desirable for the user to join the peer's mesh. In other cases, such as if the peer is known to have careless associates who routinely engage in risky computing acts such as disabling their firewalls or downloading software from sketchy sources, the user may choose not to enroll in the peer's mesh network. Thus, in some embodiments, at 226, rather than automatically accepting an invitation, the user determines whether or not to accept the invitation. In some embodiments, rather than polling the user and peer, the STN software running on their respective computers negotiate who will join whose circle of trust.

In the example shown, the process continues (228) until the user is connected to the appropriate peers. In some embodiments, the negotiation of who will join whose mesh occurs asynchronously, rather than sequentially, as shown. For example, meshes may be constructed in batches once a day, or may require more formalities (such as agreeing to terms of use set for the mesh by the user or peer), etc.

Figure 3:
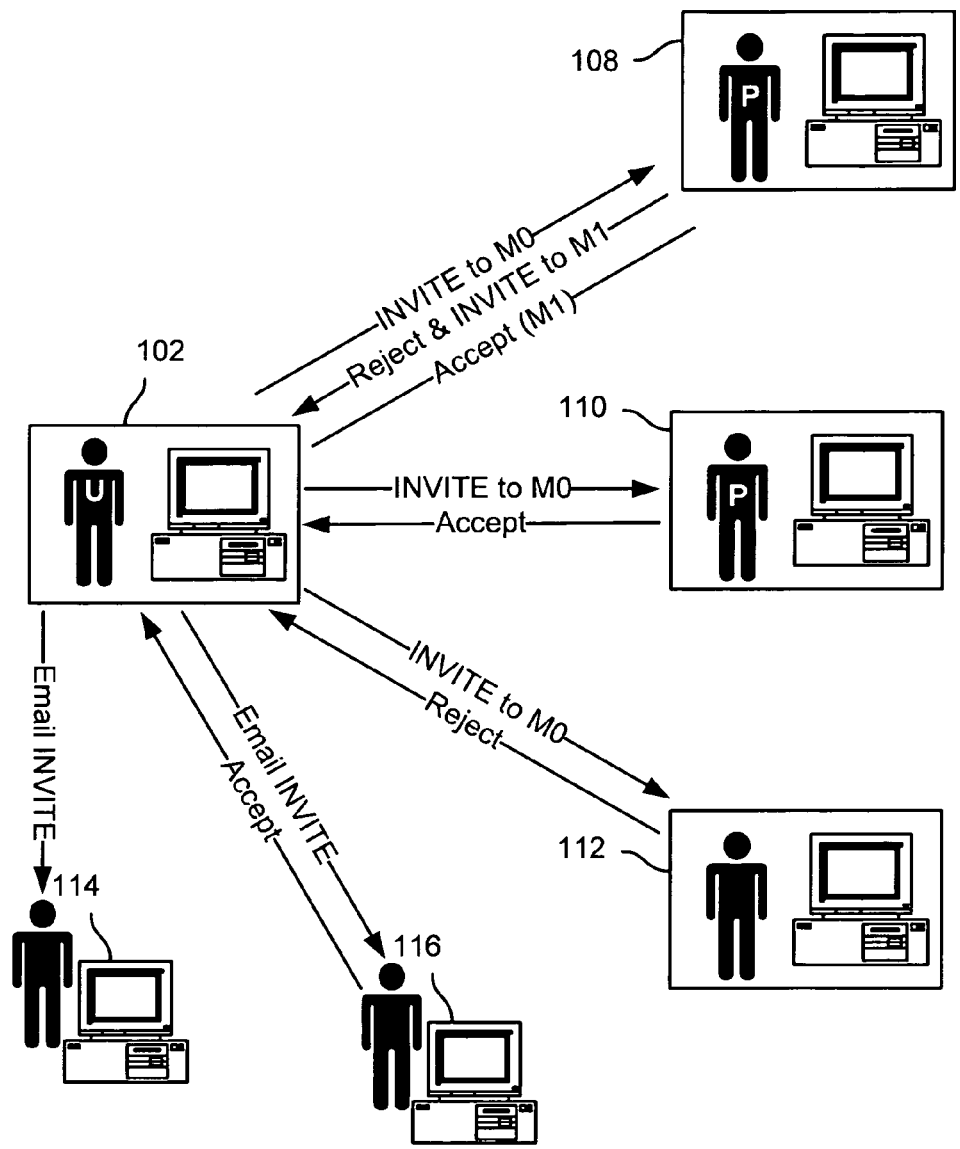
FIG. 3 is a representation of a portion of an embodiment of an enrollment process for joining a social trust network.

FIG. 3 is a representation of a portion of an embodiment of an enrollment process for joining a social trust network. The process shown depicts an embodiment of portions 212-228 of FIG. 2.

User 102 would like to invite five peers (108-116) to participate in the STN. A peer may be a person, process, application, system, device, etc. Of the five, three (108-112) are already participants running STN software on their computers. Two (114 and 116) do not already have STN software running on their computers. In the example shown, email invitations are sent to peer 114 and peer 116. Peer 114 declines to respond to the email invitation and thus does not participate in the STN. In some embodiments, peer 114 is presented with multiple options in the invitation, including a "do not ask me again" option which will prevent anyone else from attempting to invite peer 114 to the STN, for example, for a period of time, or until peer 114 takes active steps to remove the block.

Peer 116 accepts the email invitation, and is directed to download an STN client and invite additional participants to peer 116's primary mesh, if desired. Peer 116 is also added to client 102's primary mesh at this time.

In the case of existing participants 108-112, STN server 104 notifies user 102's STN agent that they are already participants in the STN and provides the STN agent with the appropriate contact/enrollment information for the participants, such as their peer IDs. Using this information, user 102's STN agent invites participants 108-112 to join the user's mesh. In the example shown, participant 112 rejects user 102's invitation. This may be the case for a variety of reasons, such as that participant 112 does not trust user 102, does not know user 102, etc.

In the example shown, both participants 110 and 108 choose to join user 102's circle of trust, however, they go about it in different ways. User 110, like peer 116, accepts user 102's invitation and joins user 110's primary mesh. However, participant 108 chooses not to join user 102's primary mesh and instead invites user 102 to participate in user 108's primary mesh. As described in more detail below, in some embodiments, the STN agent installed on user 102's computer and/or STN server 104 weights information provided to user 102 based at least in part on the degrees of separation between the user and a peer. So, for example, information provided by one of the peers in user 102's primary mesh is weighted more strongly than information provided by one of the peers in user 102's secondary mesh (i.e., peer 108's primary mesh).

Thus, after the processing shown in the example, user 102 has a primary mesh that includes peer 116 and peer 110. User 102 also has a secondary mesh (in which he is not an administrator)—the primary mesh of peer 108. With user 102 now connected into the STN, user 102 is ready to participate in the STN.

Figure 4A:
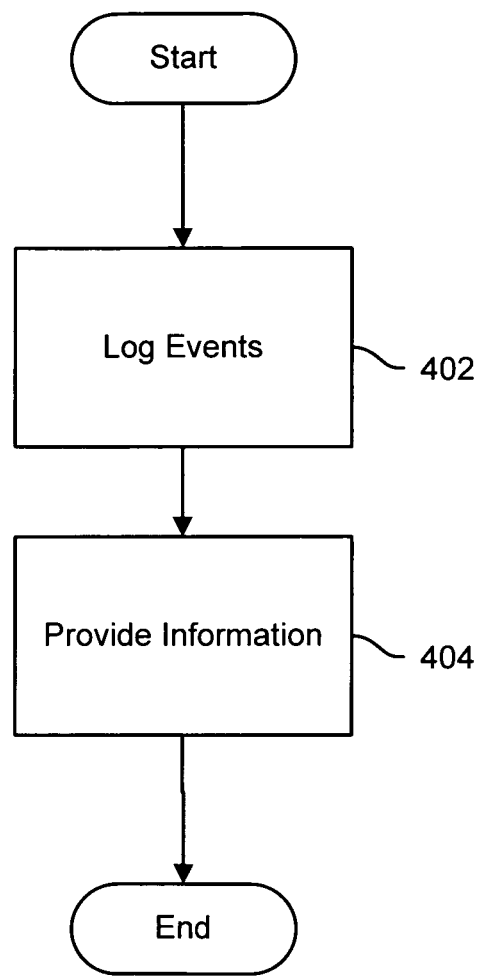
FIG. 4A is a flow chart illustrating an embodiment of a process for gathering and sharing information among peers in an STN.

FIG. 4A is a flow chart illustrating an embodiment of a process for gathering and sharing information among peers in an STN. While the processes of FIGS. 4A (and 4B) are described in conjunction with application security, the STN can be leveraged in a wide variety of ways discussed in more detail below.

When a user, such as user 102, first enrolls in the STN, the user's computer is scanned and evaluated. For example, an agent on the computer examines the state of machine and security configurations, security software installed, patch level and definition level, and license level, etc. Based on the status of the computer, an ongoing integrity score/level is determined for the computer.

The agent also indexes all of the applications that are installed on the computer, for example, taking hashes of the applications and determining their version numbers, etc. In some embodiments, the agent is pre-configured with a knowledge of the core components of the operating system on which it is installed. Essential applications, services, etc., that are known good (e.g., digitally signed by a trusted party) are excluded from indexing and monitoring.

On an ongoing basis, at 402, the agent monitors user 102's computer for events of interest. For example, every time a new executable appears on the computer, (whether acquired via download, in email, copied through network shares, as an edit to an existing application, etc.), the STN agent captures specific attributes such as where the application came from, its name, full path (or distinguishing portions of the path), and the hash of the executable. The agent also captures system information, such as current operating system version. In some embodiments, if the executable arrives via a trusted channel, such as the Microsoft update service or Symantec LiveUpdate®, it is not evaluated and/or is not considered an event of interest.

In some embodiments, the application is correlated, e.g., with events in a system event log, such as any security events, crashes, historical performance issues, etc. The agent keeps the information indexed (aggregating any new information) and ready to be reported, if needed, to one or more members of the STN.

As described in more detail below, at 404 when a new file is detected, in some embodiments, the information collected (e.g., filename, hash, etc.) is sent to the STN server and/or to the user's circle of trust.

Also at 404, in some cases, information is sent to peers and/or the STN server in response to a query. For example, the computer may respond with information such as whether the application had any firewall, vulnerability, crash, or performance issues; how long it has been used and/or how frequently it is used; whether it is a startup application, etc.

Figure 4B:
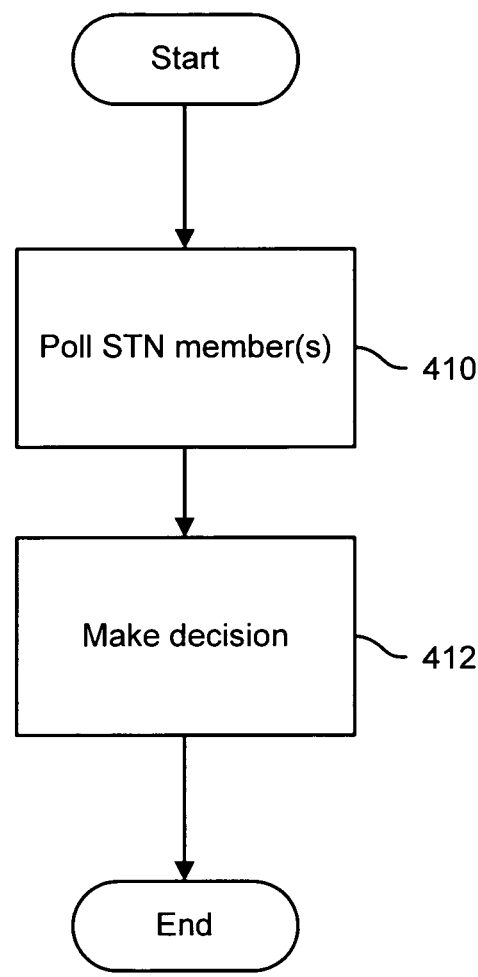
FIG. 4B is a flow chart illustrating an embodiment of a process for requesting information and making a decision.

FIG. 4B is a flow chart illustrating an embodiment of a process for requesting information and making a decision. When an event of interest is detected (e.g., new software is found on the computer), at 410, the STN agent formulates a query and couples it with information about the computer. The query bundle is transmitted to the STN server and all the members of user 102's circle of trust. On the respective hosts upon which the query arrives, their respective STN agents consult their respective indices of applications and formulate a response, as appropriate. In some embodiments, this response corresponds with 404 of FIG. 4A. Similarly, STN server 104 determines (e.g., by consulting STN database 106) if it is aware of any issues with the application.

The poll results returned to the user at 412 may take a variety of forms. In some embodiments, the response sent to user 102 by each host is a concise numerical value, such as a number from −5 to +5, where −5 indicates that the event poses a serious threat and +5 indicates that the event is harmless.

At 412, all of the responses to the polling are combined—for example by averaging or summing—and a total "vote" of whether to, e.g., install software is presented to user 102. In some embodiments, weighting is performed. For example, a peer's "integrity rating" (an automatic score based on information such as its historic security state, whether the system is up-to-date, whether it is a mobile computer or a desktop, whether it frequently connects and disconnects from networks, whether it is managed, whether it is backed up, etc.) can be combined with its "trust" rating (a score based on degrees of separation), and optionally, the severity of the problem, to derive a unified score.

In some embodiments, action is taken automatically (and silently) by user 102's computer, and is transparent to the user, such as having the software automatically install or delete itself. In other cases, the results are presented through RSS, or the results are represented graphically such as by a 3 out of 5 stars image, a thumbs up thumbs down toaster notification, via the Windows Vista Sidebar Gadget, or via a web page. In some embodiments, more detailed information is provided to the user, such as by showing the user the primary reason(s) that caused the score to be what it is (e.g., a particular peer had performance issues, or several peers had no problems with the application at all). In some embodiments, negative attributes (e.g., instances of crashes, significant resource consumption) are weighted more heavily than positive attributes (e.g., frequent use).

Figure 5:
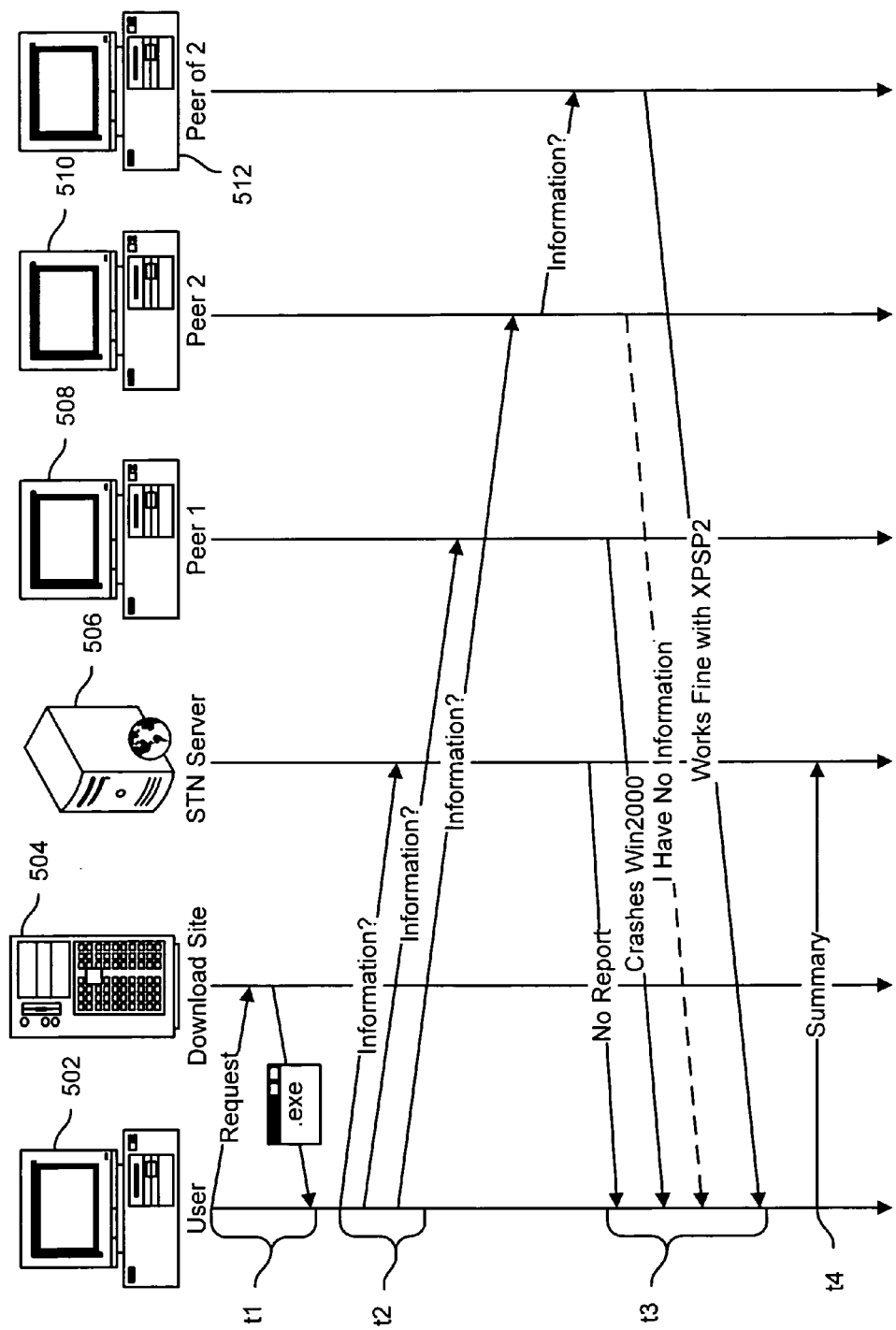
FIG. 5 illustrates an example of the interactions between members in an embodiment of a social trust network.

FIG. 5 illustrates an example of the interactions between members in an embodiment of a social trust network. At time t1, a user, such as user 502, visits a software download site, such as download site 504. User 502 selects a file (graphix.exe), and downloads it. User 502 has STN software installed and configured to check with peers before installing software. In some embodiments, the STN agent installed on user 502's computer is configured to consult with peers prior to downloading, e.g., by a context menu integrated into user 502's web browser, a proxy, a download manager, etc.

At time t2, the STN agent on user 502's computer sends out a request for information to its trust circle. In the example shown, the request is sent in sequence to STN server 506, as well as peers 508 and 510. In some embodiments, the request is broadcast.

Peer 510 determines that it has no information about graphix.exe. In addition to reporting back to user 502 that it has no information, peer 510 propagates user 502's inquiry to members of peer 510's mesh, such as peer 512. In some embodiments, whether and to what depth information requests are propagated are configurable by the user making the query.

At time t3, the various replies are received back by user 502. Peer 512 has determined, by consulting its index and associated information, that graphix.exe works well on peer 512's computer. Peer 512 also provides general architecture information—that it is a Windows XP computer running service pack 2. Peer 510 had no experience with the program, graphix.exe, and reports as much to user 502. In some embodiments, rather than reporting back, "I have no information," peer 510 remains silent. Client 508 determined that graphix.exe crashed Windows 2000, and STN server 506 had no information.

The STN agent on user 502 gathers the information reported back to it and compiles the information into a rating. In the example shown, the most positive review was also provided by the node most removed from user 502 (512). Thus, user 502 may discount the importance of peer 512's opinion in favor of peer 508's opinion. However, if user 502 is also running Windows XP SP2, user 502 may choose to value the advice of peer 512 over the advice of peer 508 because the platforms share more in common. In some embodiments, the decision of whether and/or how to weight the responses received from STN peers is automated at least in part. In the above example, for example, in some embodiments the determination that peer 512 has the same operating system and therefore peer 512's input should be weighted more heavily is at least partly automated.

At time t4, user 502 sends a summary of the results it received from its peers to STN server 506. In some embodiments, the summary is only sent when STN server 506 has no knowledge of the activity or application in question. In other embodiments, a summary is always sent. One benefit of always submitting a summary is that STN server 506 will be cognizant of the fact that a certain application is in use, and potentially, with what frequency. For example, if many inquiries are made in rapid succession about a specific file, an otherwise unidentified worm may be propagating.

Additionally, while one mesh may be fully aware that a particular file presents a danger or annoyance, another, physically disjoint mesh may not. By providing information to STN server 104, the second mesh can benefit from the "knowledge" of the first, despite the fact that the participants may reside, e.g., in different countries.

Suppose now that user 502 ultimately decides to install graphix.exe. Shortly thereafter, computer performance becomes sluggish. Additionally, user 502 notices that popup ads now constantly appear when performing basic system activities.

Annoyed by the experience, user 502 decides to uninstall graphix.exe and proceeds to do so. The STN agent can capture user 502's reasons for uninstalling graphix.exe and share the experience with peers. For example, the STN agent could ask, via radio buttons or a dialogue box, why user 502 decided to uninstall graphics.exe. Now, if another user, e.g., peer 510 wonders whether to try out graphix.exe, the information provided by user 502 can help prevent peer 510 from making the wrong decision. Similarly, suppose that user 502's woes are due to a buggy patch for a web browser. In that case, user 502 can list incompatibility as the reason for the uninstall and include an optional note warning people of this issue.

In some embodiments, information about downloads is provided, e.g., by a third party. For example, a computer magazine may dedicate space to reviewing shareware applications. If a particular file has been approved for use, e.g., by receiving a high rating from a trade publication, the information could be provided to user 502 in a variety of ways, such as overlaying the file name with a green checkmark in user 502's browser.

In various embodiments, user 502 is periodically polled about some or all of the software that is installed on the computer. For example, once a month, user 502 is consulted about whether Internet Explorer is performing well. In various embodiments, data from peers is periodically replicated to other peers.

Figure 6:
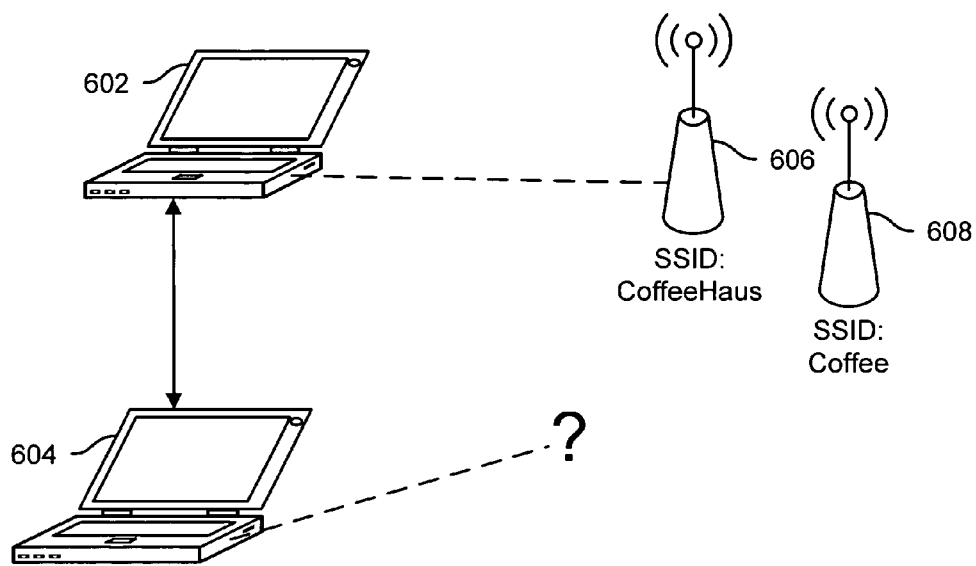
FIG. 6 is a representation of the interactions between members of a social trust network and an access point.

FIG. 6 is a representation of the interactions between members of a social trust network and an access point. Suppose user 602 (hereinafter, "Alice") visits a coffee shop offering free wireless internet access. When Alice attempts to acquire access for her laptop, she discovers that there are two wireless access points in the vicinity, one called "CoffeeHaus," (606) which has a reasonably strong signal, and one called "Coffee," (608) which has a reasonably weak signal. Alice, who is worried about being scammed, decides to ask a store clerk with which access point she should associate her laptop. (The correct one is "Coffee.") Alice's choice of the access point and all the available access points information is recorded, projected and replicated amongst peers by her STN agent which is, in this case, integrated with her wireless software.

If user 604 (hereinafter "Bob") is a peer of Alice, he can benefit from her actions. Suppose Bob also frequents the same coffee shop and has his wireless connection configured to trust peer recommendations and connection experiences to automatically decide which access point to connect to. Bob now has a hassle free and choice free auto decision process which chooses the correct access point for him, instead of defaulting to the access point with the strongest signal strength.

Suppose instead that Alice was lazy, and did not consult the store clerk before associating with an access point, and wrongly chose to associate with rogue access point 606. In some embodiments, if Alice subsequently experiences problems with the connection—e.g., if her system detects an abnormal number of port scans, ICMP packets, etc., directed at her, Alice's STN agent can negatively rate access point 606. Bob will again benefit from this behavior, as his STN agent will help him select the access point without known problems (e.g., 608) over the access point with suspicious activity (606).

In some embodiments, vendors, such as restaurateurs, partner with the owner of STN server 104 to bring "certified," or other whitelisted recommendations into the STN. For example, the owner of the coffee shop may pay the STN vendor a fee to propagate the correct decision—e.g., selecting access point 608 over access point 606. As peers tangentially connected to user 102 in some embodiments have a lower trust ranking accorded them, in some embodiments approved vendors could have higher trust rankings associated with them. In a noncommercial context, Alice may also manually rank her home access point(s) high (e.g., through radio buttons, context menus) so that when houseguests (who are STN participants) visit, they automatically select her network instead of her neighbors,' without any additional intervention on Alice's part.

In some embodiments, information has geographical relevance. For example, rather than propagating a suggestion to prefer access point 608 over access point 606 across a network of millions of people, such recommendations may be limited geographically, such as to particular networks, locations (e.g., hotel chains), etc. Similarly, peers can be configured to share certain pieces of information only with other peers who are physically nearby, such as peers who share the same LAN.

Figure 7A:
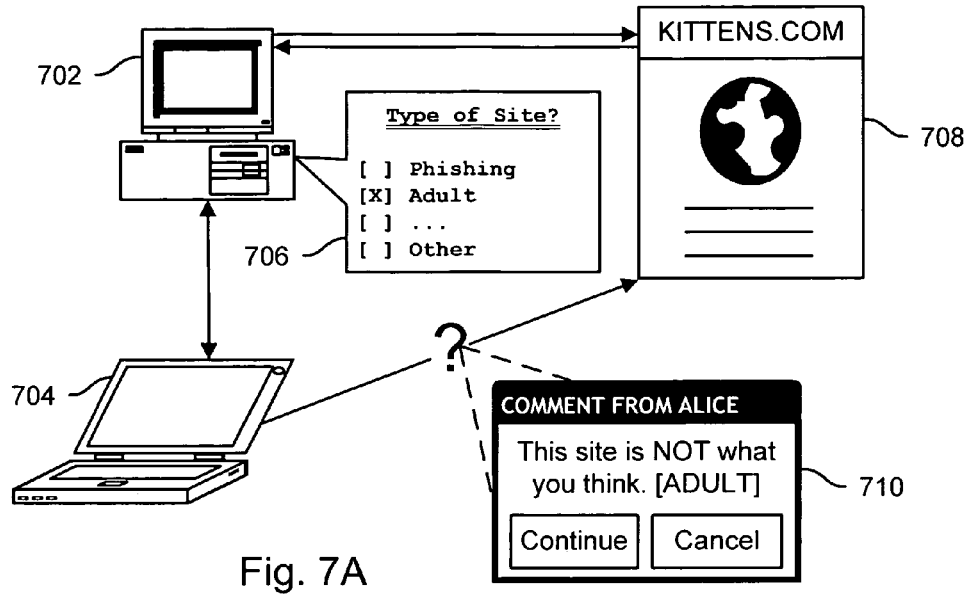
FIG. 7A is a representation of the interactions between members of a social trust network and a website.

FIG. 7A is a representation of the interactions between members of a social trust network and a website. Suppose user 702 (hereinafter "Carol") is looking for a photograph of a cat upon which to base a corporate logo that she and user 704 (hereinafter "Dave") are designing. Instead of using a search engine, she enters "kittens.com" into her web browser, hoping for the best. Carol, who does not have any content filtering software installed on her computer, discovers that the site (708) contains adult content. If Carol and Dave are both peers in the STN (and, if Dave has his STN agent configured to trust and react to Carol's ratings of websites), Carol can help prevent Dave from viewing the content by recording the fact that site 708 contains adult content. In the example shown, Carol can rate arbitrary web pages by using a context menu integrated into her web browser to mark the site. Thus, in the resulting dialogue box (706), Carol can select the appropriate category (adult content) for site 708. In this example, Carol can also add comments for others to see. Now suppose that Dave has the same approach to finding photographs as Carol. As he attempts to connect to site 708, STN agent 104 observes his DNS request and intervenes, displaying dialogue 710. If Dave wishes to view the site anyway, Dave can make the appropriate selection.

In some embodiments, rather than intercepting DNS requests made by Dave, his STN agent is configured to retrieve information about websites in a passive fashion. For example, while shopping for books online, Dave visits a popular site and adds items to his cart. Just as he is about to check out, he vaguely remembers that some of his friends had poor experiences with customer service at a large online retailer, but he cannot recall which one. Using his STN agent (e.g., through a context menu), Dave can request from his peers information about the website he is currently on. In some embodiments, the results may be similar to Carol's above—comments made asynchronously. In other cases, however, an integrated chat could be opened with any peers that are online and have experience with the site, or an instant message session could start.

Figure 7B:
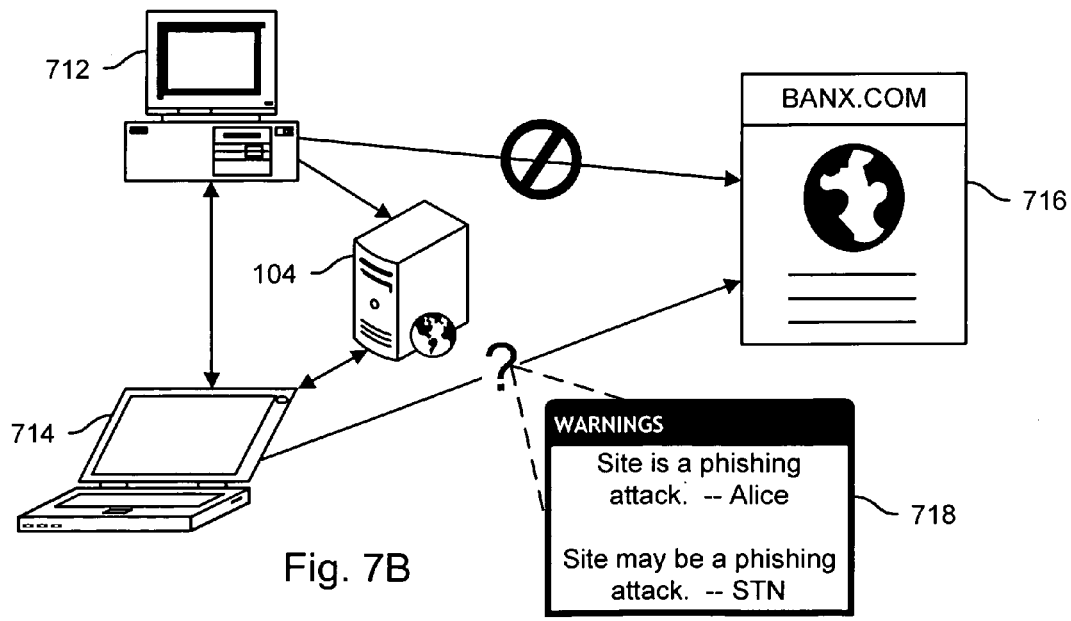
FIG. 7B is a representation of the interactions between members of a social trust network and a website.

FIG. 7B is a representation of the interactions between members of a social trust network and a website. Suppose user 712 (hereinafter "Trent") has recently signed up for online banking services. In his inbox are several phishing emails, as well as at least one legitimate email from his bank. Trent tries to be very prudent and savvy computer user. He uses only the latest software and strives to remain up to date on patches. His web browser is Microsoft Internet Explorer 7 with antiphishing filtering enabled. He follows a link in one of his emails and, while annoyed that the email is a scam, is pleased to discover that his browser detected the scam and blocked his access to it. Trent's STN agent records the event and prompts Trent for any comments that he would like to share with his peers. User 714 (hereinafter "Walter"), who still uses Microsoft Internet Explorer 6 also clicks on a link to website 716. Despite his browser lacking antiphishing capabilities, Walter nonetheless benefits from the information gleaned by Trent's STN. (Similarly, Walter could be using a platform for which no antiphishing software exists, but for which an STN agent exists, such as a PDA.)

Suppose Trent notifies STN server 104 of the danger posed by site 716. This may occur, for example, if Trent initiates the sort of report Carol made above. In some cases, the report may also be automatically generated and submitted to STN server 104. Now suppose Walter doesn't know Trent and is not his peer in the STN. If Walter has his STN agent configured properly—e.g., to intercept DNS requests and check sites for problems, Walter will still be protected from the phishing attack posed by site 716. In some embodiments, Walter has a firewall that is integrated with the STN agent that blocks him from entering sensitive information into phishing sites. Also, in some embodiments, comments from multiple peers may be presented simultaneously (718) to help enable a user to make an informed decision.

Trent's investment in security products can be leveraged by peers in other scenarios as well. Suppose Trent and another peer ("Zoe," not pictured) both receive an email with a suspicious attachment. Trent (despite his better judgment) is intrigued by the mention of a fuzzy bunny, opens the email and executes the attachment. A security product on his computer blocks the attachment from executing because it is trying to modify files in a critical operating system folder. The STN agent notes the attempted security breach in its log. In some embodiments, this information is consumed by Zoe's STN agent, which automatically deletes the contaminated email from Zoe's inbox without giving Zoe a chance to review the email and decide whether or not to keep it.

In some embodiments, all of Trent's security products (antispyware, antivirus, firewall, antiphishing, privacy filters, IDS/IPS, etc.) are STN compatible. In such a case, whenever a security event triggers a threshold amount of information, it is broadcasted so that anybody in his STN can leverage his experiences.

While specific contexts are the focus of certain examples discussed in detail above, including decisions whether and/or to what extent to trust software, websites, online vendors, email messages, wireless access points, etc., the approach described herein may be applied to inform any trust decision in a computing environment whenever one or more trusted peers may have had experiences and/or information that may be useful in making the trust decision.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for evaluating the trustworthiness of computing resources, at least a portion of the method being performed by a computing system comprising at least one processor, the method comprising:
   detecting an attempt by a user to access a computing resource associated with a computing environment;
   receiving, from a social trust network server, information relevant to evaluating the trustworthiness of the computing resource, wherein:
      the information includes a unified score that identifies the trustworthiness of the computing resource; and
      the unified score is derived at least in part from an integrity rating associated with at least one member of a social trust network that has previously accessed the computing resource, the integrity rating identifying the overall computing health of the member of the social trust network;
   determining, based at least in part on the unified score associated with the computing resource, that the computing resource represents a potential security risk; and
   blocking the user's attempt to access the computing resource.

2. The method of claim 1, wherein blocking the user's attempt to access the computing resource comprises automatically blocking the user's attempt to access the computing resource.

3. The method of claim 1, wherein receiving the information comprises receiving the information automatically and unobtrusively with respect to the user.

4. The method of claim 1, wherein the information is received asynchronously with respect to blocking the user's attempt to access the computing resource.

5. The method of claim 1, wherein the social trust network server derives the integrity rating based at least in part on information collected automatically with respect to one or more activities of the member of the social trust network.

6. The method of claim 1, wherein the social trust network server is configured to inform at least one additional member that the computing resource represents a potential security risk.

7. The method of claim 1, further comprising weighting the unified score based on a trust rating that identifies a level of trust associated with the member of the social trust network that previously accessed the computing resource.

8. The method of claim 1, wherein blocking the user's attempt to access the computing resource comprises blocking at least one of:
   an attempt to download a file;
   an attempt to open a file;
   an attempt to install software;
   an attempt to run a software application;
   an attempt to remove software;
   an attempt to visit a web site;
   an attempt to open an email;
   an attempt to interact with a particular online vendor; and
   an attempt to connect to an access point or network.

9. The method of claim 1, wherein the information comprises information that identifies at least one reason that the member of the social trust network blocked access to the computing resource after having accessed the computing resource.

10. The method of claim 1, further comprising:
    logging one or more attempts to access one or more computing resources; and
    providing information associated with the attempts to access the computing resources to the social trust network server.

11. The method of claim 10, wherein providing information associated with the attempts to access the computing resources occurs unobtrusively with respect to the user.

12. The method of claim 10, wherein providing information associated with the attempts to access the computing resources occurs without affirmative action on the part of the user.

13. The method of claim 1, wherein the computing resource comprises at least one of:
    a file;
    a file object;
    an email;
    a software component;
    an image;
    a website;
    an access point;
    a network; and
    an online vendor.

14. A security system comprising:
    a processor, configured to:
       detect an attempt by a user to access a computing resource associated with a computing environment;
       receive, from a social trust network server, information relevant to evaluating the trustworthiness of the computing resource, wherein:
          the information includes a unified score that identifies the trustworthiness of the computing resource; and
          the unified score is derived at least in part from an integrity rating associated with at least one member of a social trust network that has previously accessed the computing resource, the integrity rating identifying the overall computing health of the member of the social trust network;
       determine, based at least in part on the unified score associated with the computing resource, that the computing resource represents a potential security risk; and
       block the user's attempt to access the computing resource;
    memory, coupled to the processor, configured to provide the processor with instructions.

15. The system of claim 14, wherein the processor blocks the user's attempt to access the computing resource by blocking at least one of:
    an attempt to download a file;
    an attempt to open a file;
    an attempt to install software;
    an attempt to run a software application;
    an attempt to remove software;
    an attempt to visit a web site;
    an attempt to open an email;
    an attempt to interact with a particular online vendor; and
    an attempt to connect to an access point or network.

16. A non-transitory computer-readable-storage medium comprising computer-readable instructions that, when executed by at least one processor of a computing device, cause the computing device to:
    detect an attempt by a user to access a computing resource associated with a computing environment;
    receive, from a social trust network server, information relevant to evaluating the trustworthiness of the computing resource, wherein:
       the information includes a unified score that identifies the trustworthiness of the computing resource; and
       the unified score is derived at least in part from an integrity rating associated with at least one member of a social trust network that has previously accessed the computing resource, the integrity rating identifying the overall computing health of the member of the social trust network;
    determine, based at least in part on the unified score associated with the computing resource, that the computing resource represents a potential security risk; and
    block the user's attempt to access the computing resource.

17. The non-transitory computer-readable-storage medium of claim 16, wherein the computer-readable instructions, when executed by the processor of the computing device, cause the computing device to receive the information automatically and unobtrusively with respect to the user.

18. The non-transitory computer-readable-storage medium of claim 16, wherein the computer-readable instructions, when executed by the processor of the computing device, cause the computing device to receive the information asynchronously with respect to blocking the user's attempt to access the computing resource.

19. The method of claim 1, wherein the user voluntarily enrolled in the social trust network.

20. The method of claim 1, wherein the user voluntarily enrolled in the social trust network in response to receiving an invitation from at least one member of the social trust network to join in the social trust network.

* * * * *